United States Patent [19]
Jensen et al.

[11] Patent Number: 5,464,172
[45] Date of Patent: Nov. 7, 1995

[54] DEPLOYABLE MASS AND SENSOR FOR IMPROVED MISSILE CONTROL

[75] Inventors: Duane L. Jensen, Byron; Rolla W. Allen, Santa Clara, both of Calif.

[73] Assignee: Lockheed Missiles & Space Company, Inc., Sunnyvale, Calif.

[21] Appl. No.: 274,648

[22] Filed: Jul. 13, 1994

Related U.S. Application Data

[63] Continuation-in-part of Ser. No. 249,847, May 26, 1994, and a continuation-in-part of Ser. No. 250,042, May 27, 1994.

[51] Int. Cl.⁶ ........................... F42B 10/02
[52] U.S. Cl. ........................... 244/3.1; 102/293
[58] Field of Search ................ 89/1.8, 1.809, 89/1.816, 1.817; 102/293, 490; 244/3.1, 160, 3.16

[56] References Cited

U.S. PATENT DOCUMENTS

| | | | |
|---|---|---|---|
| 3,086,467 | 4/1963 | Gallagher et al. | 244/3.1 |
| 4,166,597 | 9/1979 | Seifert et al. | 244/160 |
| 4,549,464 | 10/1985 | Hawkins et al. | 89/1.809 |
| 4,579,298 | 4/1986 | Thomson | 244/3.21 |
| 4,624,185 | 11/1986 | Emerson | 102/293 |
| 4,709,876 | 12/1987 | Pinson | 244/3.16 |
| 4,770,369 | 9/1988 | Flock et al. | 244/3.1 |
| 4,784,350 | 11/1988 | Darden | 244/3.1 |
| 4,964,341 | 10/1990 | Hebert | 102/501 |
| 5,092,222 | 3/1992 | Lynch | 89/1.809 |

*Primary Examiner*—Charles T. Jordan
*Assistant Examiner*—Theresa M. Wesson
*Attorney, Agent, or Firm*—Feix & Feix; H. Donald Volk

[57] ABSTRACT

A flexible, aerodynamic inflatable nose fairing for use in combination with flat nosed canister-launched missiles having a wide, circular, cylindrical shape. The inflatable nose fairing is fabricated as a fiber-reinforced elastomeric membrane having a laminate construction which includes a silicone rubber inner or base layer as the gaseous pressure membrane or bladder, surrounded by two or more ply layers made up of resin-impregnated yarns. Also disclosed is a deployable mass assembly and sensor for providing improved missile control. The deployable mass assembly includes a telescoping actuator which is effective to provide stabilization control to the missile by shifting the center of gravity of the missile forwardly to compensate for a change in the center of pressure of the missile due to the change in length of the missile which occurs as the nose fairing is inflated into its deployed position.

4 Claims, 12 Drawing Sheets

FIG_1
PRIOR ART
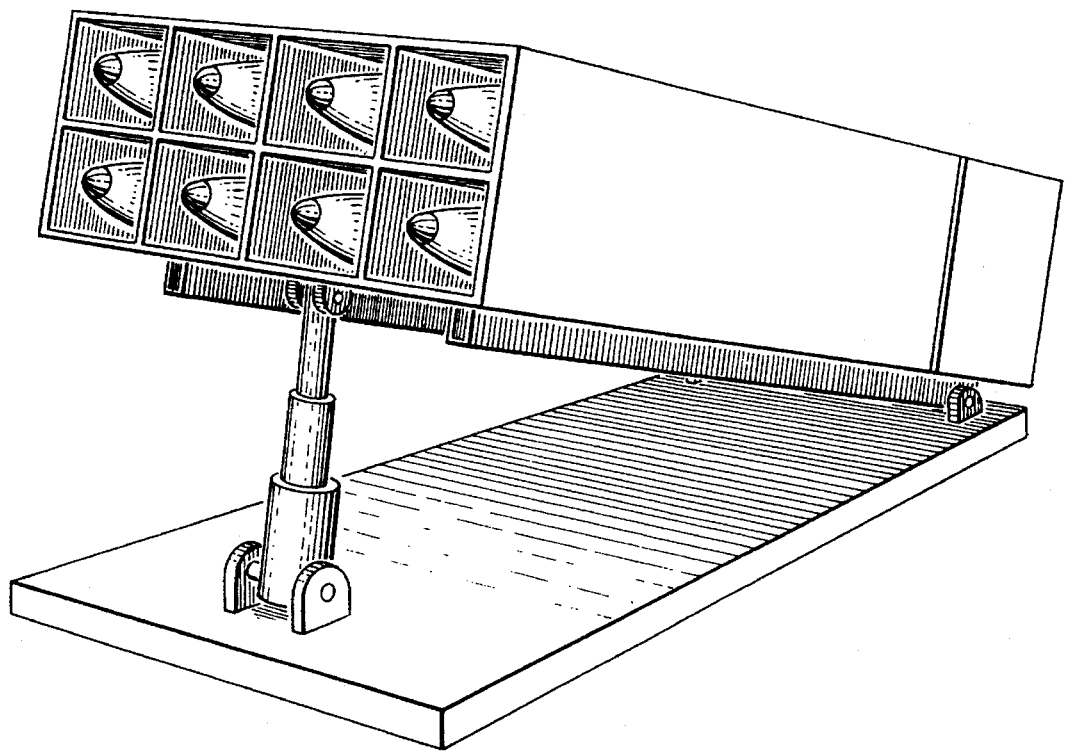
FIG_2
PRIOR ART
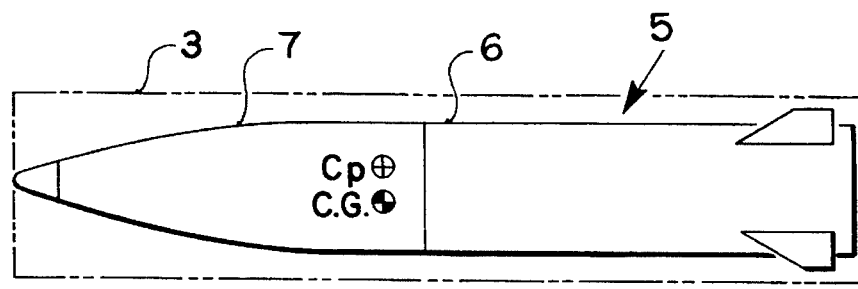

FIG_3
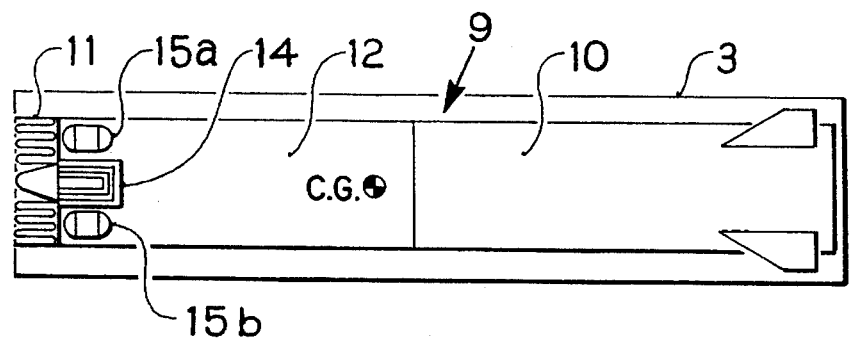
FIG_4A
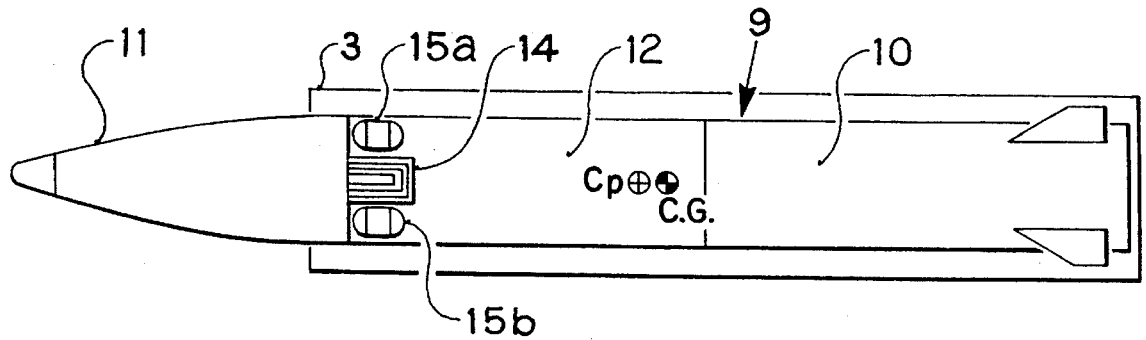
FIG_4B
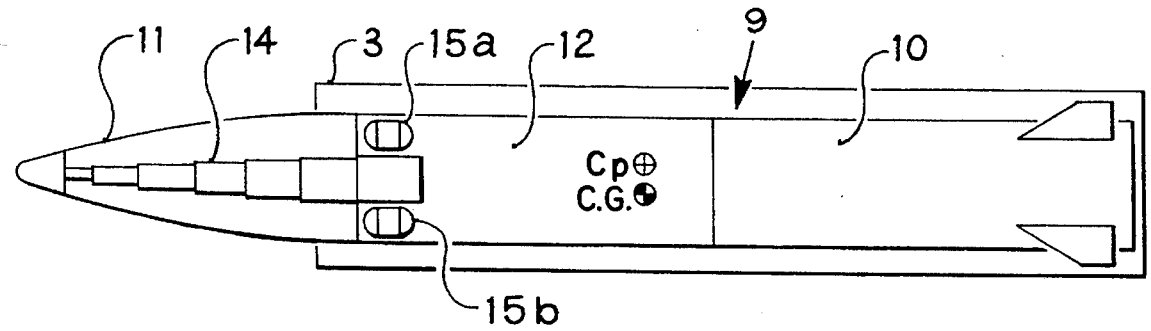

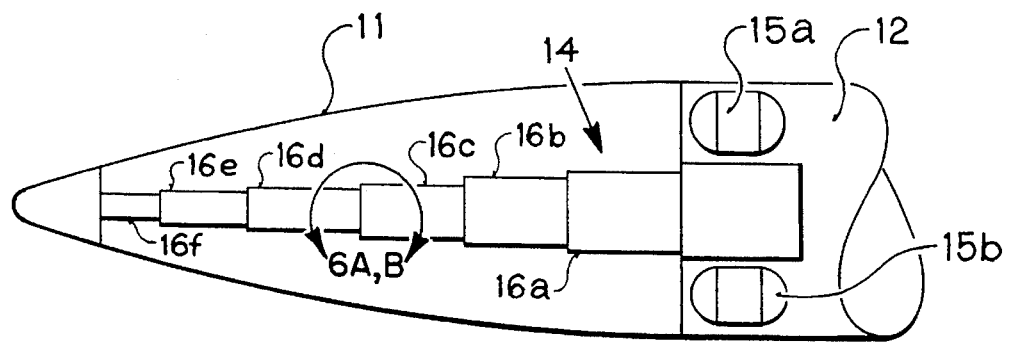
FIG_5
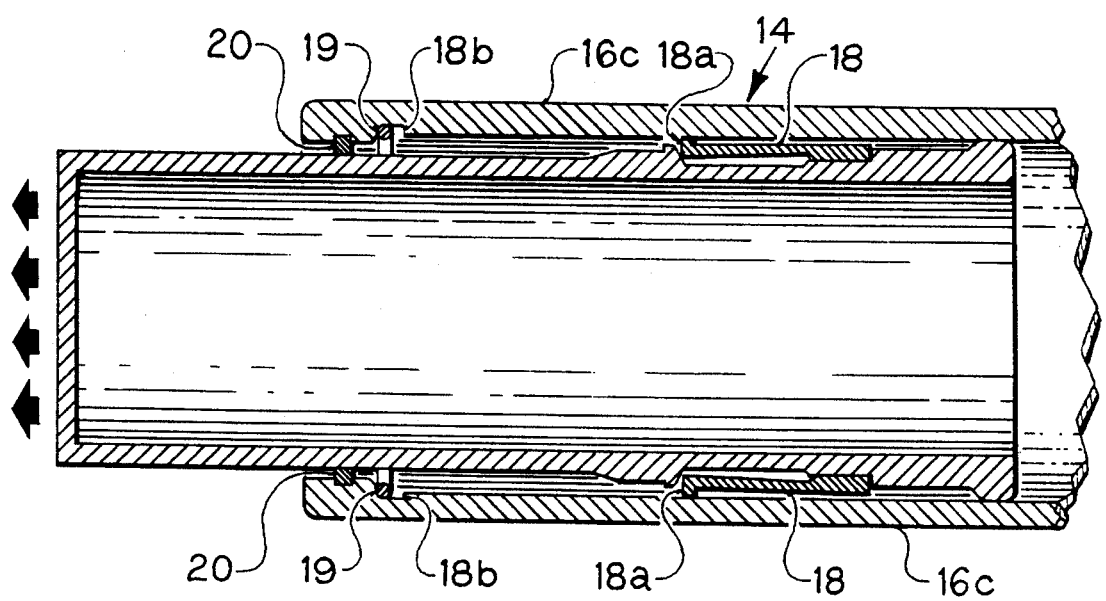
FIG_6A
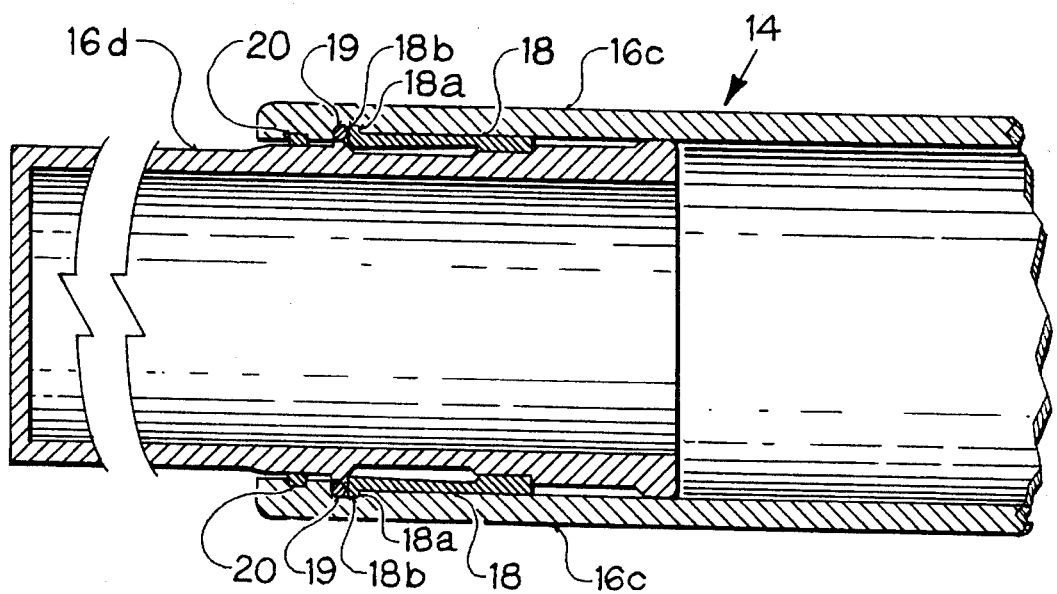
FIG_6B

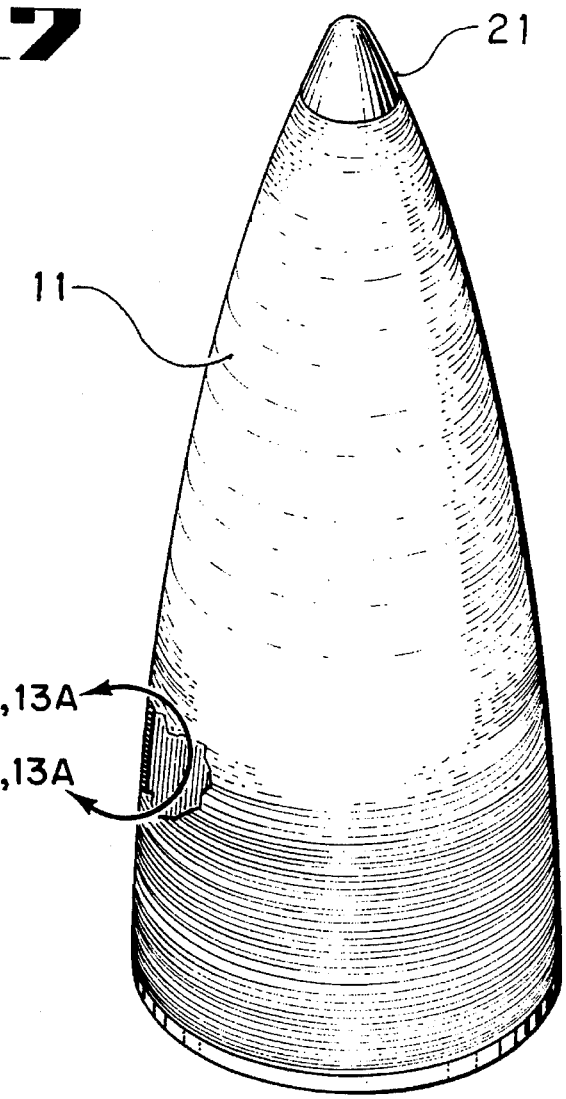
FIG_7
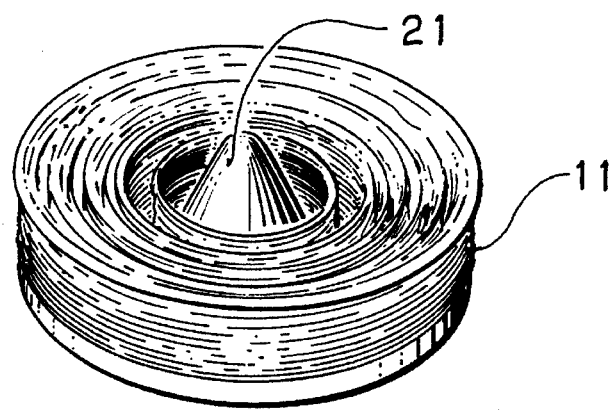
FIG_8

FIG_9A
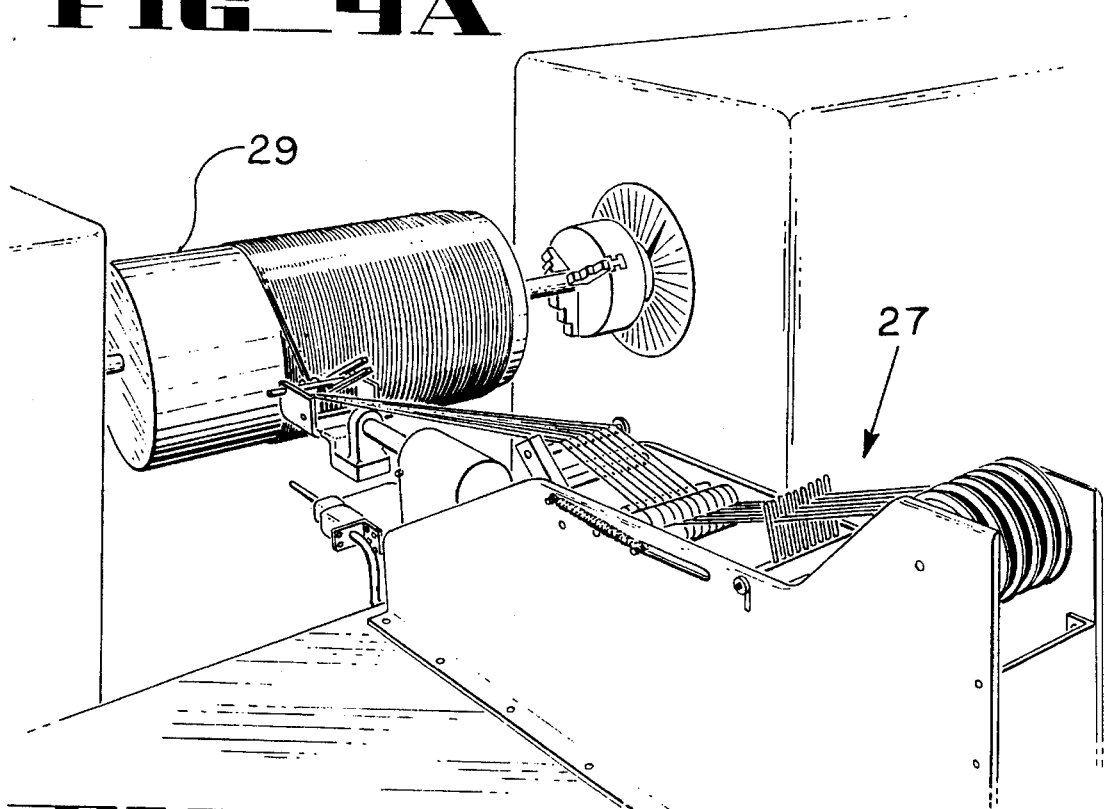
FIG_9B
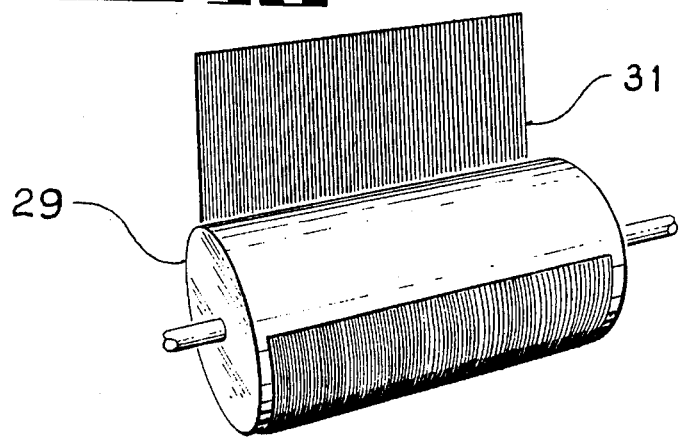
FIG_9C
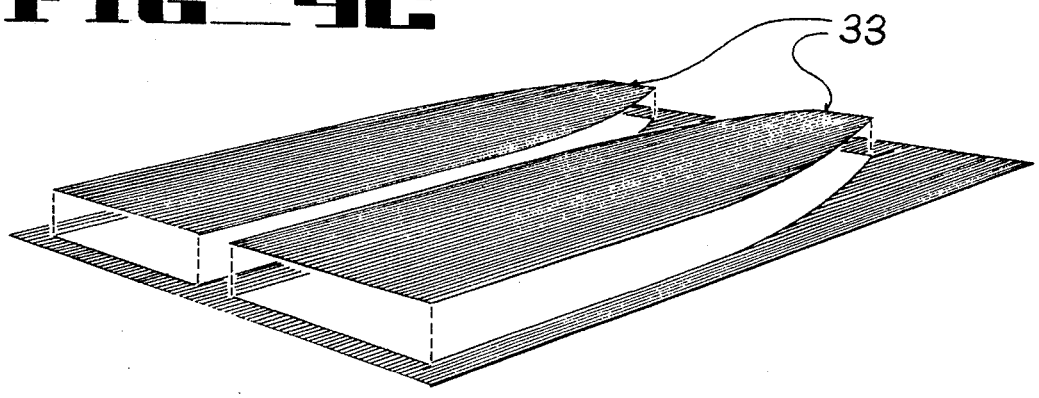

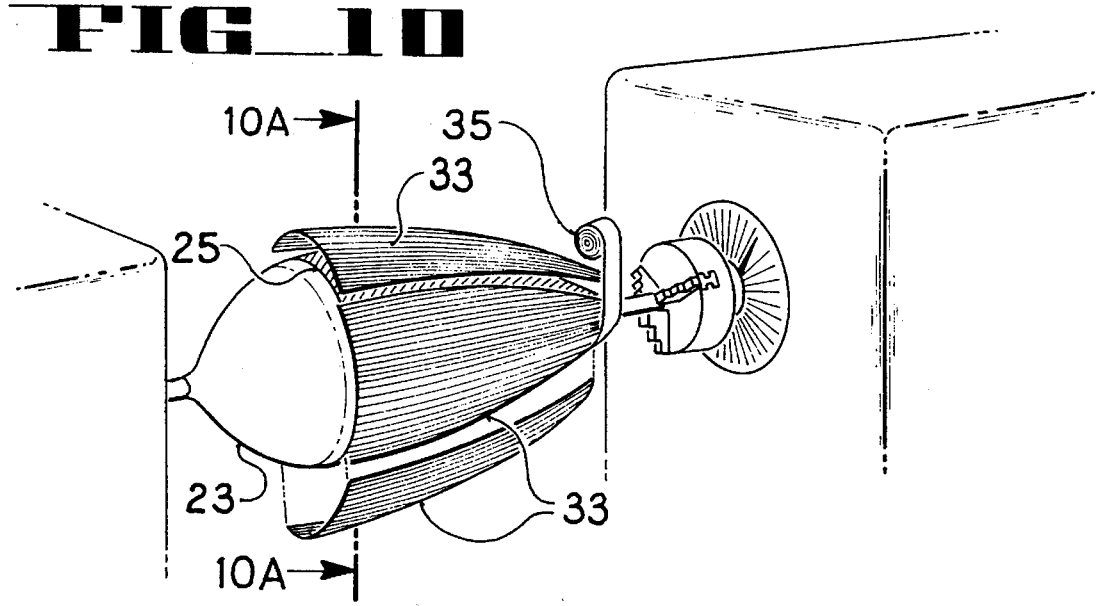
FIG_10
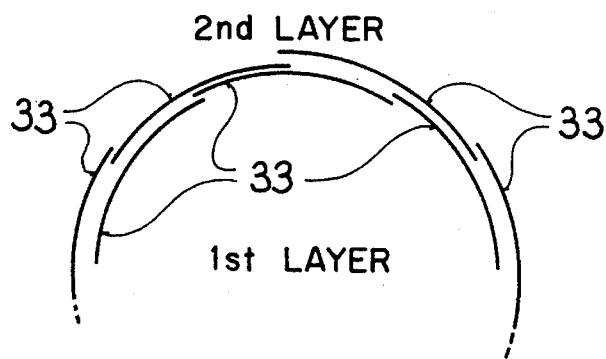
FIG_10A
2nd LAYER
1st LAYER
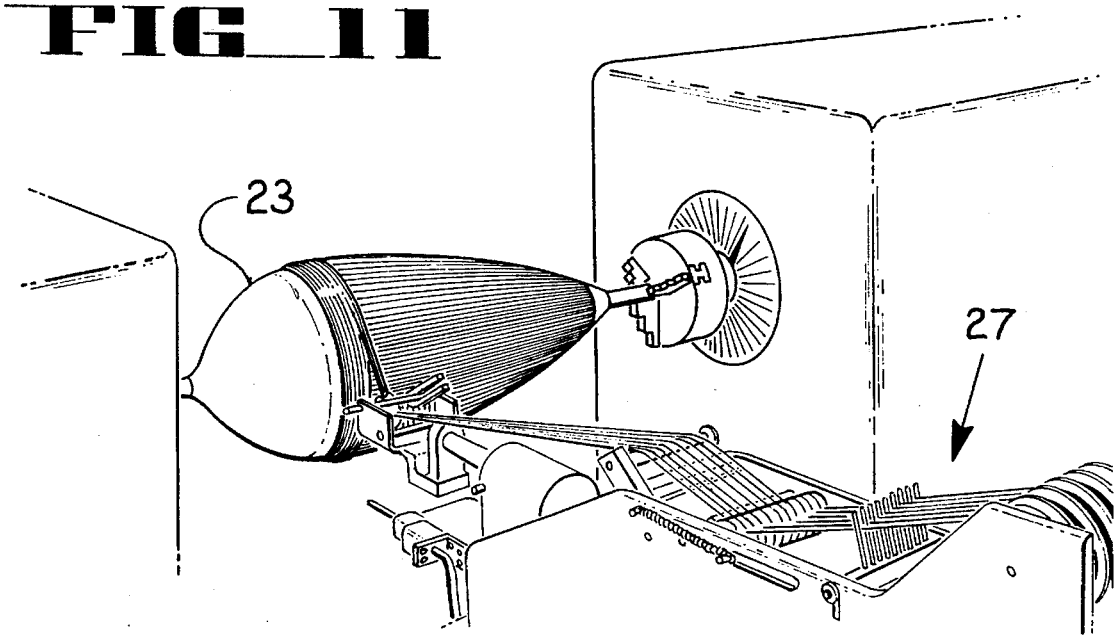
FIG_11

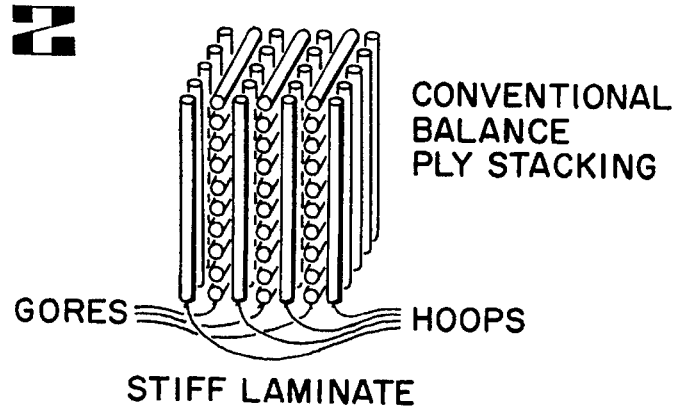
FIG_12
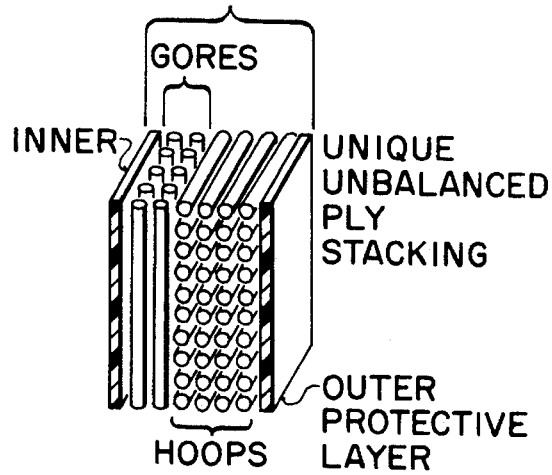
FIG_13
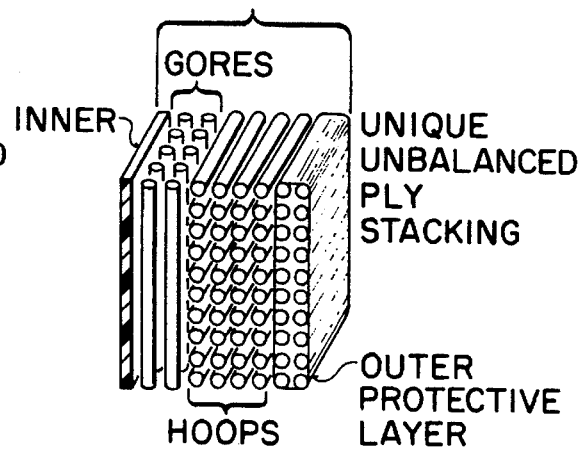
FIG_13A
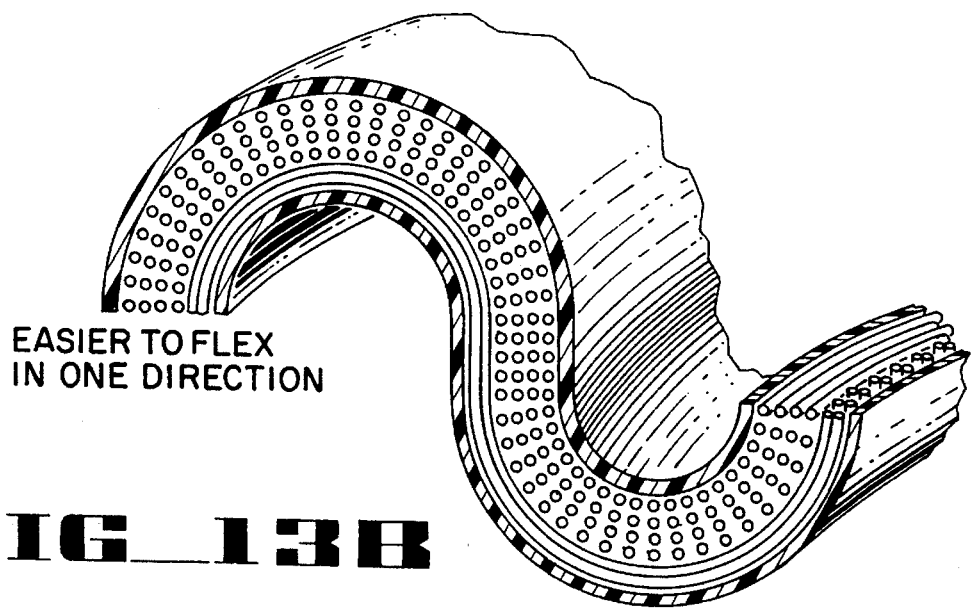
FIG_13B

FIG_14
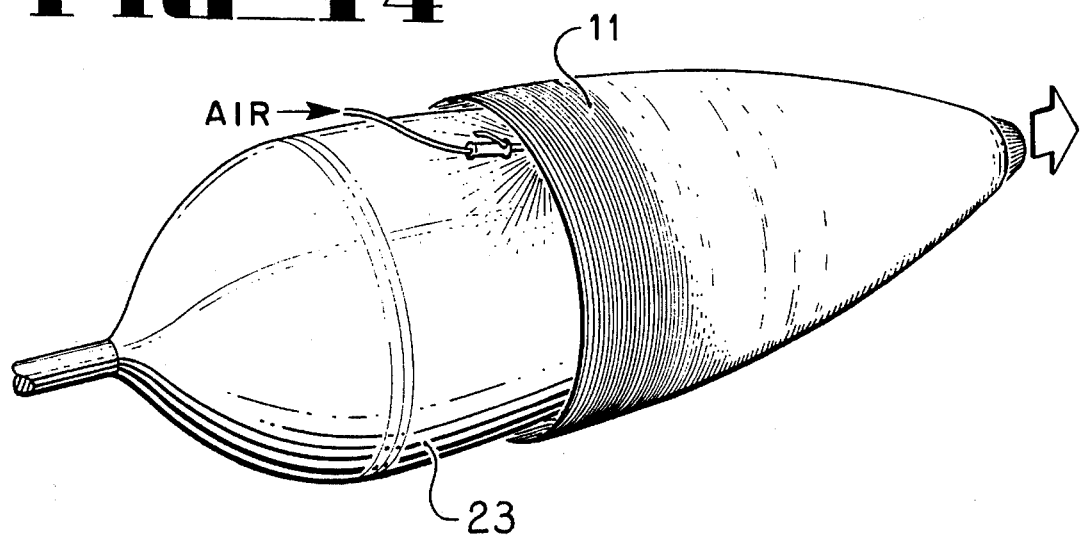
FIG_15
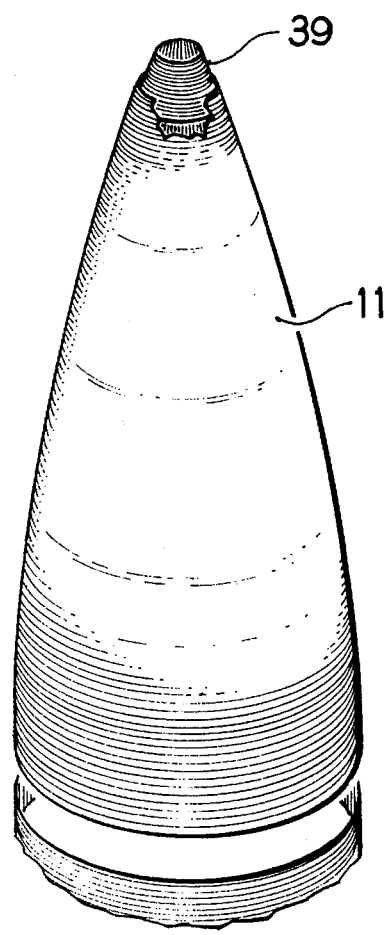
FIG_16
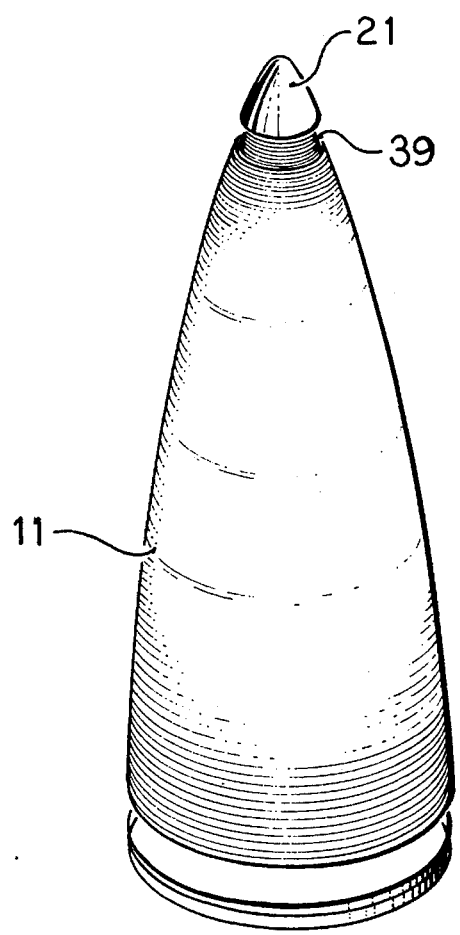

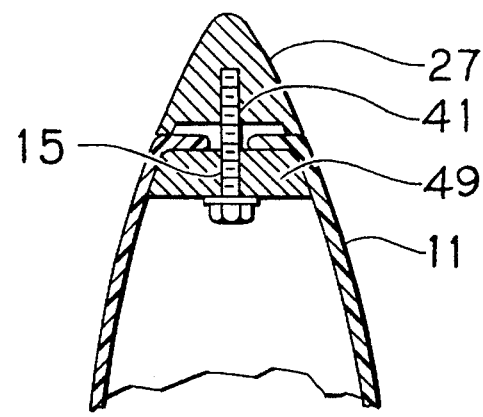
FIG_16A
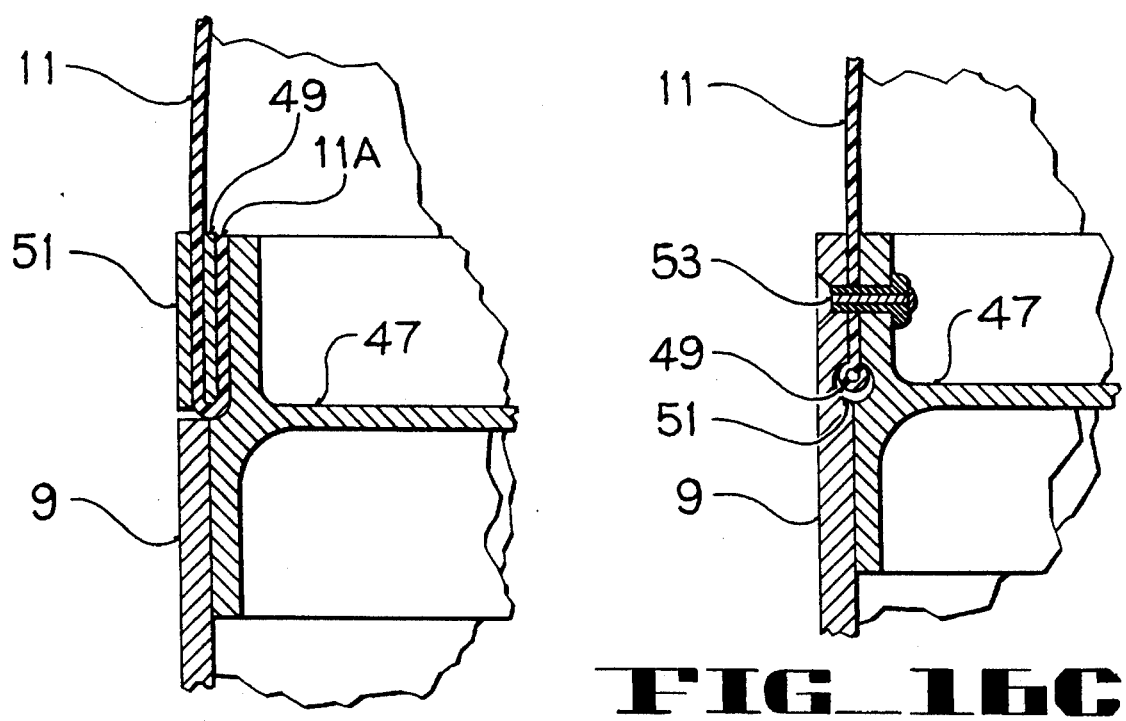
FIG_16B
FIG_16C

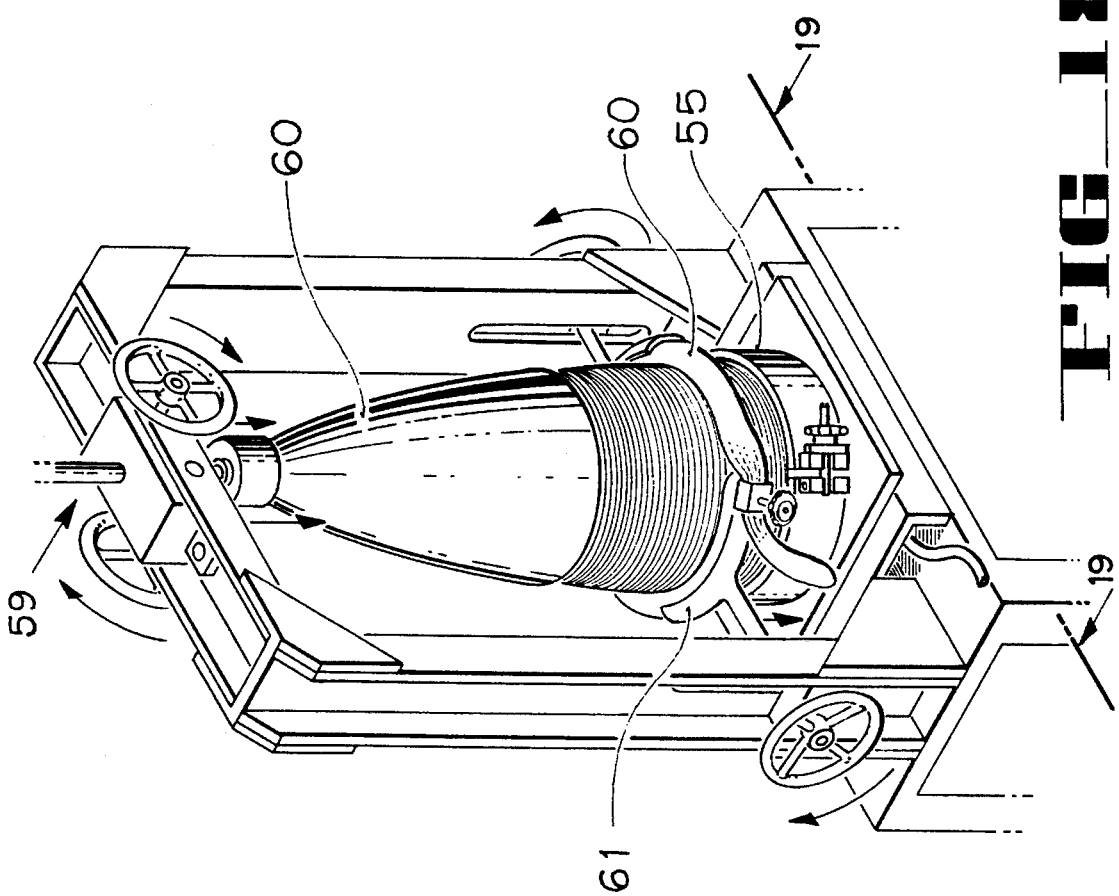
FIG_18
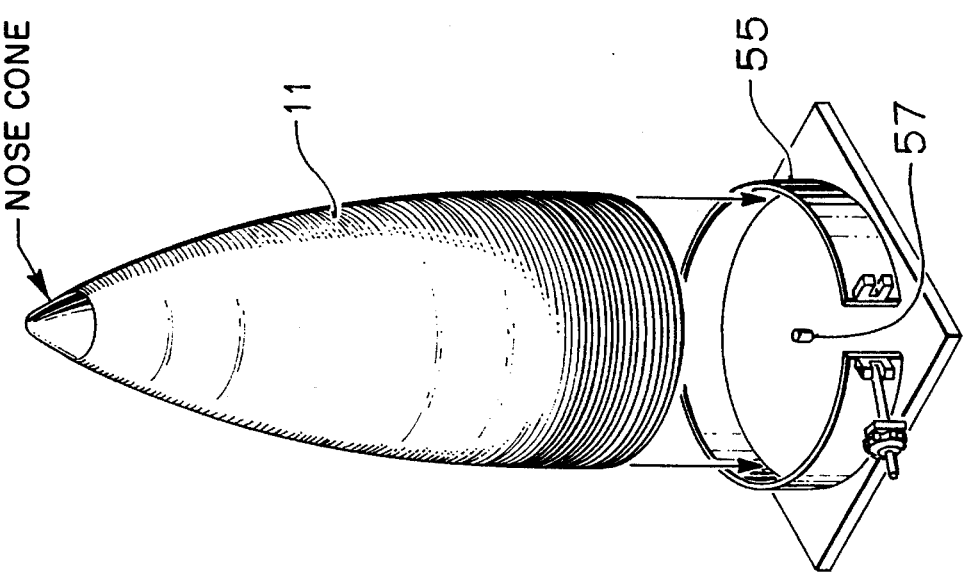
FIG_17

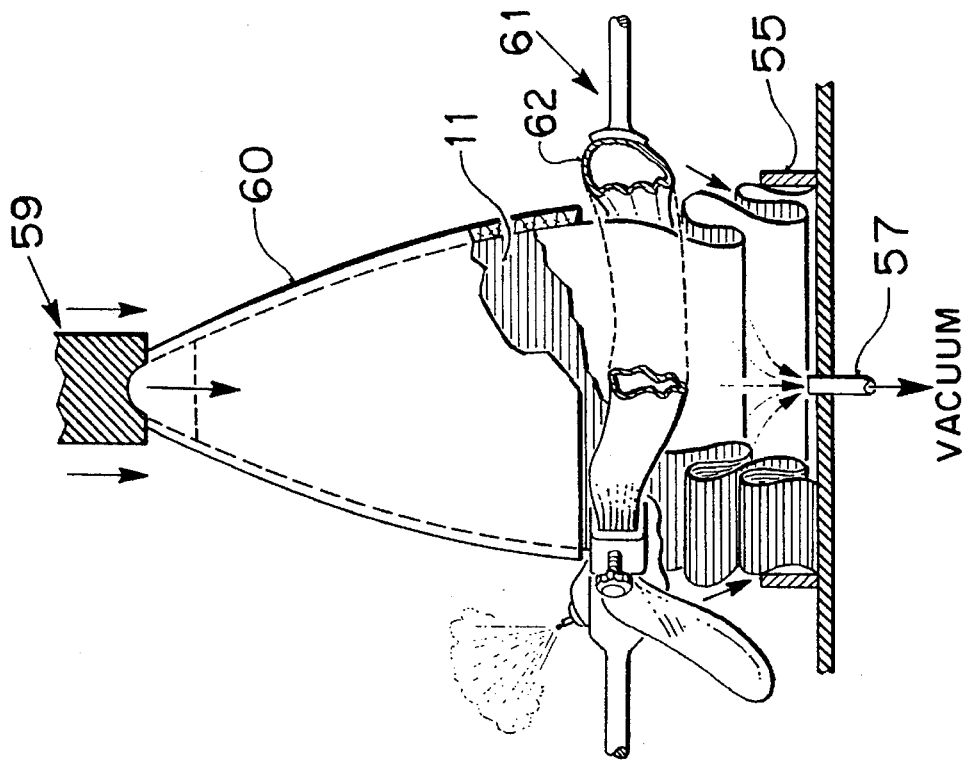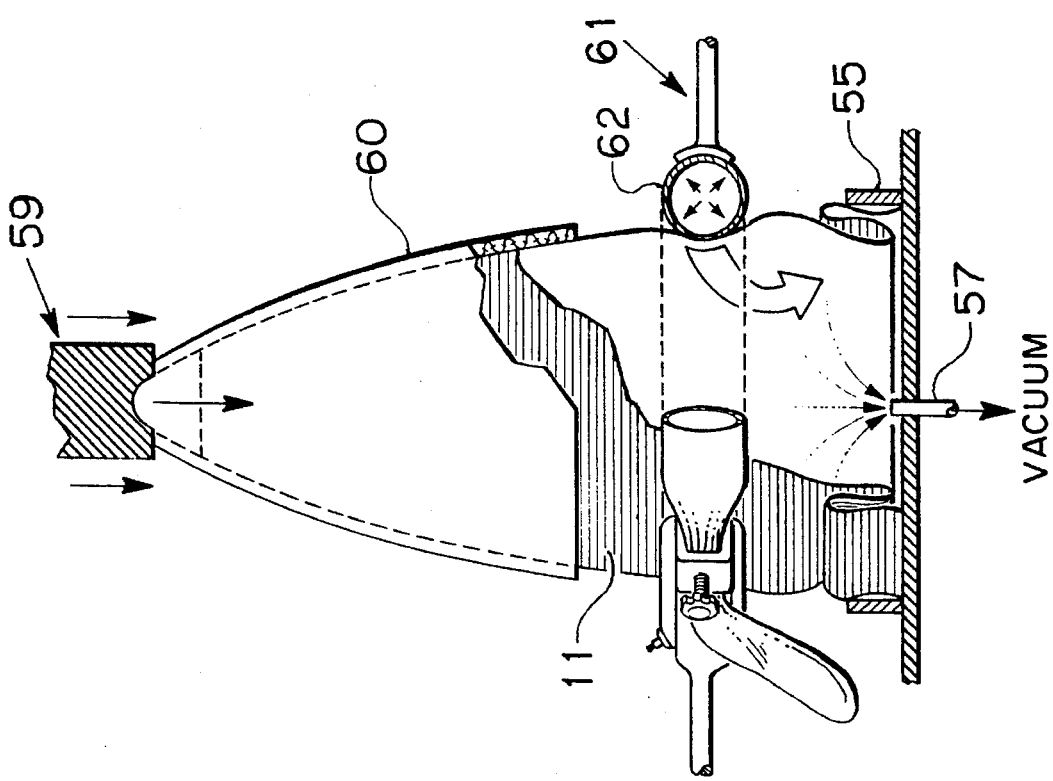

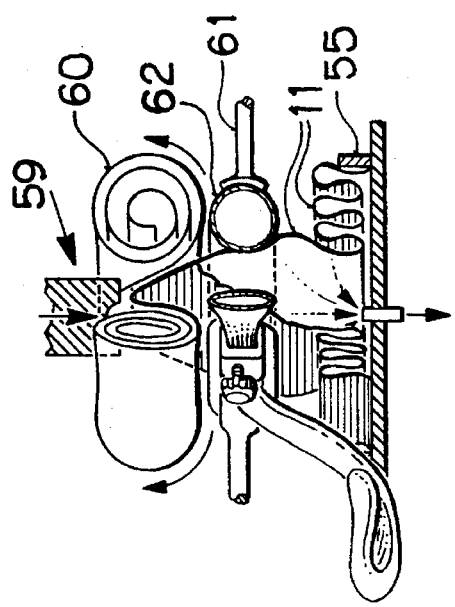
FIG_22
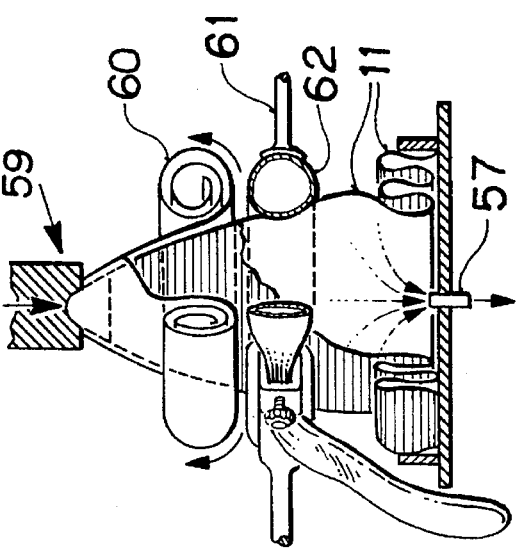
FIG_21
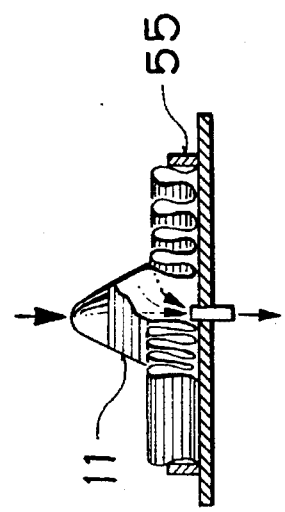
FIG_23

DEPLOYABLE MASS AND SENSOR FOR IMPROVED MISSILE CONTROL

CROSS REFERENCES TO RELATED U.S. APPLICATIONS

This application is a continuation in part of co-pending application Ser. No. 08/249,847 filed May 26, 1994 and entitled "Inflatable Nose Fairing", Duane Lowell Jensen and Rolla William Allen inventors.

This application is a continuation in part of co-pending application Ser. No. 08/250,042 filed May 27, 1994 and entitled "Fabrication Method For Inflatable Nose Fairing", Duane Lowell Jensen, Takashi Aochi Rendall W. Cothern and Philip Kent Shelton inventors.

TECHNICAL FIELD

This invention relates to improvements in length constrained propulsion systems, such as for example, canister-launched missiles. More particularly, this invention relates to a deployable mass and sensor system for providing improved missile control for canister-launched missiles having inflatable nose fairings.

BACKGROUND OF THE INVENTION

Canister launch or similar length-constrained missiles are often provided with a rigid blunt nose to achieve more efficient use of the launch-canister volume in order to meet greater range and payload requirements. A rigid blunt nose on a missile, however, increases aerodynamic drag, resulting in a range penalty.

Accordingly, it is known from the prior art how to provide a blunt nose canister launch missile with an inflatable aerodynamic nose fairing which is deployed upon broach of the launch canister. An improved filament reinforced inflatable aerodynamic nose fairing which is constructed to facilitate compact folding into a stowed position in order to achieve an increase in the overall payload volume of a length-constrained canister launch missile is disclosed in two co-pending patent application Ser. No. 08/249,847 and 08/250,042, both of which are commonly owned by the assignee of this application.

An important consideration in the design of a length-constrained missile system is the relative location of the missile's center of pressure with respect to the missile's center of gravity. In order to provide adequate missile control, the missile's center of pressure should be located near and preferably slightly aft of the missile's center of gravity.

In the usual case of a missile equipped with an inflatable nose fairing and, in particular, a smaller canister launched missile of the kind designed to be launched from mobile ground units or from the internal weapons bay of aircraft, the increase in length of the missile due to the deployment of the inflatable nose fairing creates an abrupt forward shift in the location of the missile's center of pressure.

One known technique for compensating for the change in the missiles's center of pressure is to enlarge the size of the missile's control actuators. However, larger control actuators require a smaller diameter missile body in order to fit within a launch canister of a predetermined fixed volume. This approach, however, negates the principle benefit of increased payload capacity provided by an inflatable nose fairing.

Another known technique for compensating for the change in the missile's center of pressure is to incorporate additional ballast at the forward most end of the missile's payload section and aft of the inflatable nose fairing. The additional ballast is rigidly mounted in place and therefore cannot be moved further forward into the nose fairing upon deployment for optimum distribution of mass. Thus, an undesirable amount of ballast is required to compensate for the forward change in the missile's center of pressure. Further, the additional ballast occupies precious payload volume, and therefore this approach also negates the principle benefit of increased payload capacity afforded by an inflatable nose fairing.

It would be desirable to tailor the distribution of just enough mass throughout the volume of the inflatable nose fairing upon deployment thereof in order to shift the missile's center of gravity forwardly to compensate for the forward shift in the missile's center of pressure. Further, it would be desirable to make such adjustments without modification to the missile's existing control actuators.

It is well known from the prior art to provide a missile with an optical sensor for target locating and missile guidance capabilities, For best results, the sensor should be positioned to provide a large field of view for optimum operability and should not be subjected to undesirable shock forces which could cause failure. It is known from the prior art to mount a sensor in the nose tip of a missile having a rigid nose fairing. It is also known to locate a sensor at the forward end of the missile's payload section just aft of the nose fairing. As noted above, a missile having a rigid nose fairing is undesirable for canister launch applications as it does not provide for maximum payload volume. In the case of a sensor mounted at the forward end of the missile's payload section just aft of the nose fairing, the nose fairing must be ejected during flight in order to provide a field of view to enable the sensor to function.

It would therefore be desirable to incorporate a sensor within a deployable inflatable nose fairing having increased payload capacity whereby the sensor can be deployed for positioning adjacent the nose tip portion of the inflatable nose fairing for optimum operability.

SUMMARY OF THE INVENTION

It is therefore an object of the invention to provide an inflatable nose fairing for a length-constrained missile of the type launched from canisters or from internal weapons bay of aircraft which allows for a greater increase in the payload capability of the missile than previously obtainable in the prior art and, when inflated, provides a desired aerodynamic shape for reducing drag and increase range.

It is a related object of the invention to provide a deployable mass system for use in combination with a length constrained, canister launch missile having an inflatable nose fairing, and wherein the deployable mass system provides improved missile control by shifting the missile's center of gravity forwardly in order to compensate for the forward shift in the missile's center of pressure which occurs upon deployment of the inflatable nose fairing.

It is another object of the invention to provide a deployable mass system for improved missile control which includes a telescoping actuator assembly having individual telescoping segments of predetermined mass for providing a tailorable distribution of mass within the deployed nose fairing in order to effectively shift the missile's center of gravity forwardly without the weight penalty associated with prior art fixed location ballast systems.

It is another object to provide a deployable mass system for improved missile control of the type described which includes an optical sensor mounted at a forward end thereof and wherein the sensor is positioned adjacent the nose tip of the inflatable nose fairing for a desired field of view upon deployment of the deployable mass system.

It is another object of the invention to provide the deployable mass system with suitable shock mitigating or reduction capability to protect the sensor against shock-related damage upon deployment thereof.

Methods and apparatus which incorporate the features described below and which are effective to function as described above constitute specific objects of this invention.

The inflatable nose fairing as disclosed herein represents a unique apparatus and method of obtaining additional volume where the missile's length is constrained such as with canister launched missiles or missiles launched from the internal weapons bay of aircraft. An idealized missile shape which would maximum the volume within a launch canister is a wide cylinder of constant circular diameter from rearward end to forward end. However, the drag penalties for such a flat nosed missile configuration would be severe.

Accordingly, the invention proposes to provide an inflatable nose fairing which attaches to a pressure bulkhead at the forward, flat end of a uniformly wide cylindrical missile body. The inflatable nose fairing is sufficiently flexible to allow for compact folding into a stowed position to fit within a low volume disk shaped region at the flat nose end of the missile.

A deployable mass system for providing improved missile control is also disclosed. The deployable mass system includes a selectively weighted telescoping assembly which deploys simultaneously with the deployment of the inflatable nose fairing. The deployable mass system is effective to shift the missile's center of gravity in a forward direction to compensate for the forward shift in the missile's center of pressure which occurs as a result of the increase in the missile's length due to the deployment of the inflatable nose fairing. The deployable mass system is a simple and compact solution for compensating for aerodynamic changes due to missile length changes. It allows modifications that increase the length of existing blunt or flat nose canister launch missiles without having to modify the missile's existing actuators or fins.

In one embodiment, the deployable mass system includes an optical sensor disposed and mounted at a forward end thereof. As is conventional, the sensor provides missile guidance capability by detecting landmarks and performing terrain matching functions. Upon deployment, the sensor is positioned adjacent the nose tip of the nose fairing for optimum field of view. The deployable mass system includes shock dampening or mitigating means to protect the sensor from shock related damage which may occur upon rapid deployment of the deployable mass system.

The inflatable nose fairing itself comprises a primary structure fabricated as a fiber-reinforced elastomeric membrane. The primary structure includes an inner or base layer of silicone rubber or equivalent elastomeric material which forms the pressure membrane or bladder. The inner layer is surrounded by two or more ply layers made up of resin impregnated yarns. In a preferred embodiment, the silicone rubber bladder is applied to a mandrel of generally conical or similar aerodynamic shape. The first ply layer is fabricated in three steps. The first step includes hoop winding the resin impregnated yarns on a constant diameter cylinder. The second step involves cutting to form gores of the resin impregnated hoop wound yarns. Next, the gores are applied to the generally conical shaped mandrel so that the fiber orientation of the gores are arranged generally in the axial direction of the generally conical shaped mandrel. The resin impregnated yarns of the second ply layer are applied directly over the first ply layer by steep helical hoop winding such the fibers of the second ply layer are transverse to the longitudinal or axial oriented fibers of the first ply layer.

A suitable coiled wire or flat ribbon connector may be incorporated within the primary structure to electrically connect the sensor to the control electronics of the missile. Alternatively, a suitable electrical connection may be incorporated within the telescoping actuator assembly of the deployable mass system.

It is an advantageous feature of the invention that the unbalanced ply stacking of the primary structure results in the axially oriented strands being located close to or at the neutral axis of a cross section through the axial direction of the resulting laminate so as to facilitate bending of the inflatable nose fairing in the axial direction. Indeed, the inflatable nose fairing is capable of being compactly folded along a number of closely spaced concentric fold lines to fit within a shallow disk shaped volume at the forward end of the flat nose missile, thereby permitting the length and payload capacity of the missile to be increased as compared to a conventional blunt nose canister launched missile.

An outer protective material layer may be applied to the primary structure to provide thermal insulation and protection against erosion causing elements. In the first embodiment, the outer protective layer comprises a rubber-based material which forms a hard char during flight at elevated temperatures.

In a second embodiment, the outer protective layer includes an additional hoop wound layer of resin impregnated yarns. This additional layer of hoop wound resin impregnated yarns function as sacrificial plies which peel off gradually during flight. Preferably the sacrificial plies are applied in sufficient thicknesses for each particular flight application to insure adequate thermal and erosion protection of the primary structure over the entire range of the flight.

The inflatable nose fairing technology can be used on a wide range of applications, from very small to very large missiles and from slow, loitering types to high velocity missiles.

Other and further objects and advantages of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used, and structural changes may be made as desired by those skilled in the art without departing from the present invention and the purview of the appended claims.

BRIEF DESCRIPTION OF THE DRAWING VIEWS

FIG. 1 is an isometric perspective view of a length-constrained canister launch missile assembly.

FIG. 2 is a schematic view in side elevation of a length-constrained launch canister having contained therein a rigid nose fairing-equipped missile in accordance with the prior art.

FIG. 3 is a schematic view in side elevation of a length-constrained launch canister having contained therein a flat nose missile of wide circular cylindrical shape shown equipped with a deployable inflatable nose fairing and a deployable mass system in accordance with the present invention.

FIG. 4A is a schematic view similar to FIG. 3 which shows the inflatable nose fairing in the deployed position and which illustrates the resultant forward shift in the location of the missile's center of pressure Cp.

FIG. 4B is another schematic view which shows both the inflatable nose fairing and deployable mass system in the deployed position and which illustrates the resultant forward shift in the location of the missile's center of gravity C.G. which occurs as a result of forward deployment of mass in the nose fairing.

FIG. 5 is an enlarged schematic view of the deployable mass system and sensor.

FIGS. 6A–6B is a two part series showing an enlarged fragmentary view of the portion of the deployable mass system of FIG. 5 shown encircled by arrow 6A, B in FIG. 5.

FIG. 7 is an enlarged isometric perspective view of the inflatable nose fairing of the present invention shown in a deployed position.

FIG. 8 is an enlarged isometric perspective view of the inflatable nose fairing of the present invention shown in a deployed position.

FIGS. 9A–9C, 10 is a series of isometric perspective views which illustrate the steps involved in the fabrication of the first ply layer.

FIG. 10A is a section view taken along the line and in the direction of arrows 10A—10A of FIG. 10.

FIG. 11 is an isometric perspective view illustrating the fabrication of the second ply layer.

FIG. 12 is an enlarged fragmentary section view of a conventional balanced ply filament wound laminate typical of prior art inflatable nose fairing designs which are constructed as fiber-reinforced membranes.

FIG. 13 is an enlarged fragmentary section view taken at the region indicated by the circular double arrow 13—13 of FIG. 7 illustrating one embodiment of the unbalanced ply filament wound laminate of the present invention shown in combination with a rubber-based protective outer layer.

FIG. 13A is an enlarged fragmentary section view similar to FIG. 13 illustrating the unbalanced ply filament wound laminate of the present invention shown in combination with an outer protective layer composed of additional hoop wound resin impregnated yarns.

FIG. 13B is an enlarged fragmentary isometric view in partial section illustrating the flexibility of the unbalanced ply filament wound laminate in the axial direction (i.e. in the lengthwise direction of the gore fibers).

FIG. 14 is a isometric perspective view illustrating a technique for removing a fiber-reinforced membrane from a generally conical shaped mandrel on which it has been formed.

FIG. 15–16 illustrate the finish work involved in attaching a rigid nose tip to the completed primary structure.

FIG. 16A is an enlarged fragmentary cross section view showing the detail of another connection scheme for securing a rigid nose tip to the inflatable nose fairing.

FIG. 16B is an enlarged fragmentary cross section view showing the detail of one connection assembly for securing the inflatable nose fairing to the forward end of the missile body.

FIG. 16C is an enlarged fragmentary cross section view similar to FIG. 16B showing the detail of another connection assembly for securing the inflatable nose fairing to the forward end of the missile body.

FIGS. 17–23 is a series of drawing views in isometric perspective which illustrate the method steps and apparatus used for folding the inflatable nose fairing along concentric folds such that it will fit within a shallow, substantially planar disk-shaped volume for compact stowage at a forward end of a length-constrained missile body.

DETAILED DESCRIPTION OF THE PREFERRED EMBODIMENTS

The inflatable nose fairing of the present invention is provided for use in combination with length-constrained missiles which are launched from fixed length launch canisters. A fixed length ground based missile launcher assembly 1 is shown in FIG. 1. Other examples of length-constrained canisters are found in submarines or are contained within the internal weapons bay of aircraft.

FIG. 2 is an enlarged schematic view of one canister 3 of the missile launcher assembly 1 having contained therein a missile 5 having a rigid nose fairing 7. As is conventional, the missile 5 is designed such that its center of gravity C.G. and center of pressure Cp are located at approximately the same location for desired flight control characteristics.

In this design, the cylindrical length portion of the missile 5 contains a fuel section 6 and the rigid nose fairing 7. As is readily apparent from the drawing, the fixed general conical shape of the rigid nose fairing 7 prevents space within the launch canister 3 from being fully utilized thus limiting the payload and fuel capacity of the missile. This is also the case with blunt nose missiles although to a lesser extent.

FIG. 3 is a view of a length-constrained launch canister 3 similar to FIG. 2 but shows contained therein a generally blunt or flat nose missile 9 equipped with an inflatable nose fairing 11 constructed in accordance with one embodiment of the present invention. As is conventional, the missile 9 includes a fuel section 10 and a payload section 12. The inflatable nose fairing 11 of the present invention is shown compactly folded in the stowed position against the forward blunt or flat nose end of the payload section 12.

The inflatable nose fairing includes a first pressurized gas system 15a, preferably comprising a solid propellant gas generator, which when activated, discharges gas for inflating the inflatable nose fairing 11 into the rigid aerodynamic position. The pressurized gas system 15a further includes gas delivery means (not shown) for directing the gas to the nose fairing 11 and pressure relief means (also not shown) to provide compensation for altitude pressure changes and thermal environmental changes.

FIG. 4A shows the inflatable nose fairing 11 in the deployed position. FIG. 4A also illustrates the change in the relative location of the center of pressure Cp with respect to the center of gravity C.G. which occurs as a result of the increased length of the missile 9 upon deployment of the inflatable nose fairing 11.

As best seen in FIG. 4B, the actuation of the deployable mass assembly 14 is effective to move the missile's center of gravity C.G. forward to offset the forward shift of the missile's center of pressure Cp and thereby provide improved missile control. This allows current missiles to use their existing fins and actuators to maintain acceptable stability margins. A second pressurized gas system 15b may also be provided to facilitate the rapid telescoping deployment of the deployable mass assembly 14 in accordance with conventional aerospike deployment techniques.

FIG. 5 shows a preferred embodiment of the deployable mass assembly 14 in the form of a telescoping actuator made up of individual telescoping segments 16a–f. The progressive difference in size between successive telescoping segments provides a desired progressive distribution of mass within the interior of the inflatable nose fairing 11. That is, the weight of the individual telescoping segments 16a–f advantageously becomes progressively lighter towards the smaller forwardmost end. A desired mass distribution for a specific missile application is easily tailorable by selective dimensioning of the individual telescoping segments 16a–f. Of course, it is understood that any greater or lesser number of telescoping segments may be employed for satisfactory results. Also, the segments themselves may comprise different materials of construction for other possible combinations of density and mass distribution.

The telescoping actuator assembly 14 also includes a nose tip portion 17 for containing an optical sensor 17a. As is conventional, the optical sensor 17a relays visual signal information to the control electronics or missile guidance system of the missile (not shown) for target identification and terrain matching. The nose tip portion 17 is preferably formed integral with the nose piece of the inflatable nose fairing.

FIGS. 6A–6B illustrate, by way of example, the detail of the lockable interconnection between two telescoping segments 16c, 16d of the telescoping actuator assembly 14. In operation, the telescoping actuator assembly 14 is deployed by activation of the pressurized gas system 15b (eg. see FIG. 4B) which introduces pressurized gas inside the telescoping actuator assembly 14 thereby causing the individual telescoping segments to extend outwardly in the direction indicated by the arrows in FIG. 6A. The base end of each telescoping segment, in this case segment 16d, includes spring biased detent members 18. Each detent member 18 has a hooked end 18a adapted for engagement within a corresponding recess 18b disposed in the interior wall of the preceding telescoping segment, in this case segment 16c, in order to lock the adjoining segments 16c, 16d in the extended position. This is best seen in FIG. 6B.

The rapid deployment of the telescoping actuator assembly 14 in combination with the above described detent locking action, if left unchecked, will tend to generate a sudden shock force that may ultimately cause the sensor 17a to fail. Accordingly, in order to dampen or mitigate this shock force, a shock mitigating o-ring 19 is provided to the recess 18b. Pressure seals 20 are also provided to facilitate the rapid deployment of the telescoping actuator assembly 14 by internal pressurization.

FIGS. 7 and 8 illustrate in greater detail the aerodynamically shaped inflatable nose fairing 11 of the present invention. FIG. 7 shows the inflatable nose fairing 11 in the deployed position. FIG. 8 shows the inflatable nose fairing 11 in the concentrically folded stowed position. The inflatable nose fairing 11 comprises an aerodynamic or generally conical shaped primary structure constructed as a composite of elastomeric material and resin impregnated fibers. The selected materials of construction are assembled as a filament wound laminate which exhibits minimal property degradation at elevated temperatures and low susceptibility to fiber damage. The inflatable nose fairing includes a rigid nose tip 21.

In accordance with one advantageous feature of the invention, the ordered arrangement of the individual ply layers of the laminate exhibit improved flexibility over prior art designs so that the inflatable nose fairing is capable of being compactly folded in concentric circles about central axis to fit within a shallow planar disc shaped volume of reduced height. This is shown in FIG. 8.

FIGS. 9A–9C, 10, 10A and 11 illustrate the fabrication process of the present invention. The fabrication process involves alternately spreading layers of elastomeric material and winding filament yarns impregnated with elastomeric material on a mandrel of the desired configuration. In this case, the primary structure is built up on a generally conical shaped mandrel 23 (see eg. FIG. 10).

Selection of a suitable elastomeric material entails evaluation of the following characteristics: viscosity, tear strength, shear strength, tensile strength, modulus, cured stiffness and thermal properties. A suitable elastomeric material for the inflatable nose fairing is the silicone rubber composition sold by Dow Corning under the trademark SYLGARD® 184 RESIN.

Suitable yarns for use as the reinforcement filaments include carbon or graphite filaments, quartz yarns, fiberglass and high modulus organic filaments of aramids and the like. Preferred yarns include the family of high thermal quartz yarns known by the trademark ASTROQUARTZ® available through J. P. Stevens and also the less expensive fiberglass family of yarns. Especially suitable for the inflatable nose fairing is the fiberglass yarn marketed by the Owens Corning Fiberglass Corporation under the trademark S2 GLASS®.

The impregnation of yarn with the elastomeric material, in this case silicone rubber, includes spreading the yarn into fibers and encapsulating the fibers in a resin formed of the silicone rubber. Complete encapsulation of the fibers is desirable as it increases the effective shear area and thus the shear capability of the filament wound laminate. In order to function as a liquid in a resin bath to impregnate the yarns, the silicone rubber is diluted with a solvent. A dilution of about 50% by weight is generally satisfactory to achieve low volatiles and provide slow flash off of the solvent during curing of the rubber compound.

The first step in the fabrication process is to coat the mandrel 23 with a release agent to provide for the removal of the completed part from the mandrel 23. Suitable release agents include, for example, industrial release agents, hand soap or hair spray.

Next, a thin coating of elastomeric material, preferably the same or similar silicone rubber composition as is used for impregnating the yarns, is applied to the mandrel as a base or inner layer to form a gaseous pressure membrane 25.

Next, the first and second ply layers of filament wound resin impregnated yarns are applied to the conical mandrel 23.

A filament winding apparatus 27 is used for paying out yarns from a spool under controlled tension. The filament winding apparatus preferably includes means for spreading and directing the dry fibers through a resin bath and means for removing excess resin or otherwise controlling resin pick up. Such an apparatus and its method of winding operation for fabricating a fiber-reinforced elastomeric membrane for providing and inflatable nose fairing is known, for example, from U.S. Pat. No. 4,921,557.

The first ply layer consists of generally longitudinally oriented fibers (i.e. oriented in the axial direction of the conical mandrel 23) and is formed in two steps. First, the resin impregnated yarns are hoop wound onto a constant diameter cylinder 29 using a steep helical or circumferential winding technique (see FIG. 9A). The resulting unidirectional fiber-reinforced elastomeric sheet material 31 is then removed from the constant diameter cylinder 29 (see FIG. 9B) and cut into gores (see FIG. 9C). The gores 33 are then applied to the conical mandrel 23 with a slight overlap at adjoining edges. This is shown in FIG. 10. The gores 33 are preferably held in place by tape 35 or by other means such as, for example, a single helically wound strand.

As is best seen in FIG. 10A, a second layer of gores 33 may also be applied in offsetting fashion relative to the first layer of gores 33 to provide additional reinforcement to buttress the force of the internal inflation pressure exerted on the pressure membrane 25 during deployment of the nose fairing. This is especially critical near the nose tip where the longitudinally oriented fibers are shortest in length.

Next, the second ply layer of resin impregnated yarns is applied by steep helical winding. This is shown in FIG. 11. In this design, the hoops or circumferential fibers of the second ply layer carry substantially the entire pressure load and therefore a greater number of circumferential fibers or hoops are needed for adequate strength. In the preferred embodiment, the ratio of circumferential fibers (hoops) to longitudinal or axial fibers (gores) is 2:1.

FIG. 12 illustrates a conventional balanced ply filament wound laminate such as in used in the prior art inflatable nose fairing design. Balance ply laminates are known to be stiff and therefore are not easily bendable into tight radius curves since the fibers are distributed throughout the cross section and away from the neutral axis.

FIG. 13 illustrates the unbalanced ply filament wound laminate of the present invention. The unbalanced laminate comprises a primary structure which includes the inner elastomeric layer or pressure membrane, the first ply layer made up of the longitudinally oriented fibers or "gores" and the second ply layer made up of circumferential fibers or "hoops".

A final fabrication step involves application of an additional outer layer to the hoops to protect the primary structure against material degradation due to thermal extremes and erosion caused by debris, sand, ice and other like particles which may be encountered during a missile flight. In one embodiment, this outer protective layer comprises a rubber-based composition which will form a hard char when subjected to elevated temperatures.

FIG. 13A shows an alternate embodiment wherein the outer protective layer is made up of additional circumferentially wound yarns. These additional yarns, referred to as "sacrificial plies", will tend to gradually degrade over time by flaking or peeling when subjected to erosion causing elements. The thickness of the sacrificial ply layer is selected per specific application and environmental conditions.

Once the protective outer layer is applied, the finished structure is allowed to cure. In one embodiment, the finished structure is cured in the as formed condition such that the fibers are not in strain when the nose fairing is inflated into the deployed position. In another embodiment, the completed structure is first folded into the stowed position and then allowed to cure such that the fibers are not in strain when the nose fairing is in the stowed position. A benefit of curing after folding is that the nose fairing can now be stowed for long periods of time (years) in its natural cured state with a minimum of fiber strain.

As illustrated in FIG. 13B, the unbalanced laminate easily bends in the axial direction, i.e. in the direction of the longitudinal fibers or gores. The reason for this is best understood with reference to normal bending stress analysis of a beam. It is well known that elements of a beam coincident with the neutral plane (i.e. the plane which contains the neutral axes of all cross sections of the beam) have zero strain. Also, the strain or resistance to bending of a "fiber" increases as its location is moved a further distance away from the neutral axis. In the present invention, the axial or longitudinal fibers of the unbalanced laminate are concentrated near the neutral axis of a cross section taken through the axial or longitudinal direction of the filament wound laminate thus making it is easier to bend the unbalanced laminate in the longitudinal direction.

The unbalanced ply stacking allows the completed structure to be compactly followed into a shallow stowed position as shown in FIG. 8. A related benefit of the unbalanced ply stacking is that there are fewer filament winding steps involved so that less elastomeric material is required therefore further enhancing flexibility. This makes it possible to use higher temperature rated silicone rubber compositions (for higher thermal applications) which otherwise tend to be less flexible.

FIG. 14 illustrates one way for removing the completed structure from the mandrel 23 by using compressed air to break the adhesion bond therebetween.

FIGS. 15–16 illustrate one way of securing the nose tip 21 to the nose fairing 11. In this case the nose tip 21 is fashioned as a rigid shell member. In order to provide sufficient surface area for bonding the nose tip 21 to the top of the nose fairing 11, a resin impregnated filament wound inner nose tip portion 39 is first formed and bonded to the interior of nose fairing 11. This is shown in FIG. 15. Next, the shell-like nose tip 21 is fitted over and bonded to the inner nose tip portion 39 and outer nose fairing 11. Elastomeric material and/or additional resin impregnated yarns may be applied by filament winding to provide a desired smooth transition at the junction between the nose tip 21 and the nose fairing 11.

FIG. 16A shows an alternate embodiment for securing the nose tip 21 to the nose fairing 11. In this case the nose tip 21 is fashioned a solid conical piece and is provided with a threaded axial bore 41. A wedge shaped lock member 43 is fitted within t e conical end of the nose fairing 11. The assembly is anchored in place by a screw 45 which, upon tightening, draws the nose piece 21 and lock member 43 together about the top circular opening of the nose fairing 11.

FIG. 16B shows one embodiment of a joint attachment for securing the nose fairing 11 to the flat nose end of missile 9 in an air tight manner. In this embodiment, the bottom edge of the nose fairing 11 is doubled back inwardly to provide a inboard flap portion 11a. The inboard flap portion is sandwiched between a pressure bulkhead 47 and an inboard skin retention band 49. An outboard skin retention band 51 holds the bottom edge of the nose fairing 11 tight against the inboard skin retention band 49.

FIG. 16C shows a second embodiment of an air tight joint attachment. In this embodiment, the top edge of the missile 9 extends upwardly such that it is roughly even with the top edge of the pressure bulkhead 47. A circumferential cord 49, being enveloped within bottom perimeter edge of the nose fairing 11, is receivingly engaged within a perimeter groove 51 formed at the junction between the inner surface of the missile skin and the pressure bulkhead 47. One or more recessed head screw fasteners 53 are used to hold the joint attachment together.

FIGS. 17–23 illustrate an apparatus for compactly folding the nose fairing 11 into the stowed position. The preferred apparatus includes: a fixed clamp 55 for holding the wide circular bottom end of the nose fairing 11 over a vacuum source 57; a plunger assembly 59 for exerting downward pressure onto the nose cone; and an adjustable perimeter clamp assembly 61 for exerting inwardly directed side pressure about the perimeter of the nose fairing 11. The plunger assembly 59 includes a conical holder 60 sized to fit over the nose fairing 11 for distributing the downwardly directed load over a wider surface area. The adjustable perimeter clamp assembly 61 includes a circumferential air bladder or inner tube 62 for providing an even distribution of inwardly directed side pressure.

In operation, downward pressure is exerted on the nose fairing 11 by the plunger 59 and holder 60. At the same time, radially inward side pressure is exerted on the nose fairing at a location just above the bottom clamp 55 by the adjustable perimeter clamp assembly 61 and pressurized inner tube 62. Air pressure within the nose fairing 11 is withdrawn by vacuum 57. This causes the bottom edge of the nose fairing 11 to fold inwardly and downwardly as indicated in FIG. 19. The air pressure within the inner tube 62 is then released thereby allowing the nose fairing 11 to resume is normal shape after which the inner tube 62 is repressurized and the above steps are repeated (see FIGS. 20–23) until the nose fairing 11 is concentrically folded into the stowed position (see FIG. 8).

While we have illustrated and described the preferred embodiments of our invention, it is to be understood that these embodiments are capable of variation and modification, and we therefore do not wish to be limited to the precise details set forth, but desire to avail ourselves of such changes and alterations as fall within the purview of the following claims.

We claim:

1. An inflatable aerodynamic nose fairing assembly for use with a length-constrained, canister launch missile having an elongated cylindrical shape with a uniformly wide circular cross section from rearward end to forward end, comprising:
    a) a filament-reinforced flexible membrane attached to the forward end of the missile and inflatable from a first stowed position to a second deployed position wherein:
        i) said membrane when in said stowed position is compactly folded to permit the missile to be lengthened and the usable payload capacity of the missile to be expanded to its full wide circular cylindrical shape;
        ii) said membrane when in said deployed position is extended forwardly to form an aerodynamic shape for reduced drag and improved range and performance;
    b) inflation means for rapidly inflating said membrane into said deployed position upon broach of the missile canister; and
    c) mass deployment means for deploying balancing masses forwardly within said membrane as said membrane is inflated into said deployed position and for maintaining a required balanced relationship between center of pressure and center of gravity of the missile for stable flight control, and wherein said mass deployment means comprises a telescoping actuator assembly which includes:
        i) plurality of telescoping segments each of which are selectively weighted to provide a progressive distribution of mass within said membrane;
        ii) nose tip portion which forms a portion of a corresponding nose end of the membrane, said nose tip portion includes sensor means for detecting targets and for providing guidance information to the missile; and
        iii) shock mitigation means for mitigating shock to the sensor means as the telescoping actuator assembly is forwardly deployed within said membrane.

2. The inflatable aerodynamic nose fairing assembly according to claim 1 wherein said inflation means comprises a solid propellant gas generator.

3. A mass deployment assembly for providing improved flight control in a missile of the type having a generally blunt forward end and an inflatable aerodynamic nose fairing attached to the blunt forward end, and in which the inflatable nose fairing is deployable from a first stowed position to a second aerodynamic deployed position, said mass deployment assembly comprising:
    a) telescoping actuator assembly mounted to and extendable from the blunt forward end of the missile;
    b) deployment means for deploying said telescoping actuator assembly simultaneously with the inflation of the inflatable nose fairing into its deployed position: and
    c) said telescoping actuator assembly for shifting the center of gravity of the missile forwardly to maintain a required balanced relationship between the center of gravity and the center of pressure of the missile for stable flight control, and wherein said telescoping actuator assembly includes:
        i) a plurality of telescoping segments each of which are selectively weighted to provide a progressive distribution of mass within the inflatable nose fairing;
        ii) a nose tip portion which forms a portion of a corresponding nose tip end of the inflatable nose fairing, said nose tip portion includes sensor means for detecting targets and for providing guidance information to the missile; and
        iii) shock mitigation means for mitigating shock to the sensor means as the telescoping actuator assembly is forwardly deployed within the inflatable nose fairing.

4. The mass deployment assembly for in proved missile control according to claim 3 wherein said deployment means comprises a solid propellant gas generator.

\* \* \* \* \*